(12) United States Patent
Backus et al.

(10) Patent No.: US 8,907,216 B2
(45) Date of Patent: Dec. 9, 2014

(54) CABLE PORT PROTECTION APPARATUS

(71) Applicant: SmallHD, LLC, Cary, NC (US)

(72) Inventors: Dale C. Backus, Apex, NC (US); Weston L. Phillips, Raleigh, NC (US); Kyle A. Tucker, Raleigh, NC (US)

(73) Assignee: SmallHD, LLC, Cary, NC (US)

( * ) Notice: Subject to any disclaimer, the term of this patent is extended or adjusted under 35 U.S.C. 154(b) by 120 days.

(21) Appl. No.: 13/841,696

(22) Filed: Mar. 15, 2013

(65) Prior Publication Data

US 2013/0269980 A1 Oct. 17, 2013

Related U.S. Application Data

(60) Provisional application No. 61/623,890, filed on Apr. 13, 2012.

(51) Int. Cl.
*H02G 11/00* (2006.01)
*G03B 17/56* (2006.01)

(52) U.S. Cl.
CPC .............. *H02G 11/00* (2013.01); *G03B 17/561* (2013.01); *G03B 17/566* (2013.01)
USPC ....................................................... 174/72 A

(58) Field of Classification Search
CPC ................................ H02G 11/00; H02G 3/04
USPC ........... 396/348, 429, 419, 535, 544, 422, 27; 174/72 A, 135, 545, 68.1, 68.3
See application file for complete search history.

(56) References Cited

U.S. PATENT DOCUMENTS

| 4,470,077 A * | 9/1984 | Komine | 386/358 |
| 5,121,174 A * | 6/1992 | Forgerson et al. | 257/271 |
| 6,950,214 B2 * | 9/2005 | Abundis | 358/487 |

\* cited by examiner

*Primary Examiner* — William H Mayo, III
*Assistant Examiner* — Krystal Robinson
(74) *Attorney, Agent, or Firm* — Myers Bigel Sibley & Sajovec (57) ABSTRACT

A cable port protection apparatus includes a frame that is configured to be secured to a housing of an electronic device, and a cable retention mechanism attached to the frame that is configured to prevent unintentional removal of a cable from a cable port of the electronic device. The cable retention mechanism includes a pair of spaced-apart arms extending outwardly from the frame to define a cable receiving space. A gate is operably associated with the spaced-apart arms and is movable by a user between open and closed positions. When in an open position, a cable can be inserted by a user through the cable receiving space and connected to a cable port. When in a closed position, the cable is prevented by the gate from becoming disconnected from the cable port and from exerting potentially damaging forces on the cable port.

20 Claims, 8 Drawing Sheets

CABLE PORT PROTECTION APPARATUS

RELATED APPLICATION

This application claims the benefit of and priority to U.S. Provisional Patent Application No. 61/623,890 filed Apr. 13, 2012, the disclosure of which is incorporated herein by reference as if set forth in its entirety.

FIELD OF THE INVENTION

The present invention relates generally to cameras and, more particularly, to camera cable ports.

BACKGROUND

Digital cameras have become very popular and have many advantages over traditional film cameras, including the ability to record and display video. In some cases a separate display is utilized with a digital camera for viewing video during recording and/or during playback. Such a display is connected to a video port, such as an HDMI (high definition multimedia interface) port, via a cable. Unfortunately, such cables can become disconnected from a digital camera, particularly if pulled or moved by a user. In addition, axial and bending forces exerted on a cable during camera use can damage some camera ports.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a cable port protection apparatus includes a frame that is configured to be secured to a housing of an electronic device, and a cable retention mechanism attached to the frame that is configured to prevent unintentional removal of a cable from a cable port of the electronic device. In some embodiments of the present invention, the frame is configured to be secured to a portion of the housing of an electronic device and has a contour that substantially conforms to a contour of the housing portion. A locking device is provided that allows a user to removably secure the frame to the housing.

In some embodiments of the present invention, a cable port protection apparatus is configured to be attached to a portion of a housing of a camera, such as a digital camera. The frame includes an opening that provides cable access to a cable port in the camera housing. The frame includes a locking device that is configured to engage a carrying strap eyelet mounted to the camera housing and removably secure the frame to the camera housing. In some embodiments of the present invention, the locking device includes a threaded member that contacts an upper surface of the carrying strap eyelet and the frame includes a tab that extends upwardly through the eyelet to secure the frame to the camera housing. In some embodiments of the present invention, the frame includes a replacement eyelet that can be used to receive a carrying strap.

The cable retention mechanism extends from a lower portion of the frame adjacent the cable port opening and includes a pair of first and second spaced-apart arms extending outwardly from the frame to define a cable receiving space. A gate is operably associated with the spaced-apart arms and is movable by a user between open and closed positions. The gate may include a handle configured to be gripped by a user and that facilitates movement of the gate by the user between the open and closed positions. When in an open position, a cable can be inserted by a user through the cable receiving space and connected to a cable port. When in a closed position, the cable is prevented by the gate from becoming disconnected from the cable port and from exerting potentially damaging forces on the cable port.

In some embodiments of the present invention, the gate is configured to engage a cable connector inserted within the cable port when the gate is moved to the closed position and to prevent the cable connector from disengaging from the cable port. The gate includes an open-ended slot that engages the cable connector when the gate is moved to the closed position by a user. In some embodiments of the present invention, the gate is releasably retained in the closed position by at least one of the spaced-apart arms.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Figure 1:
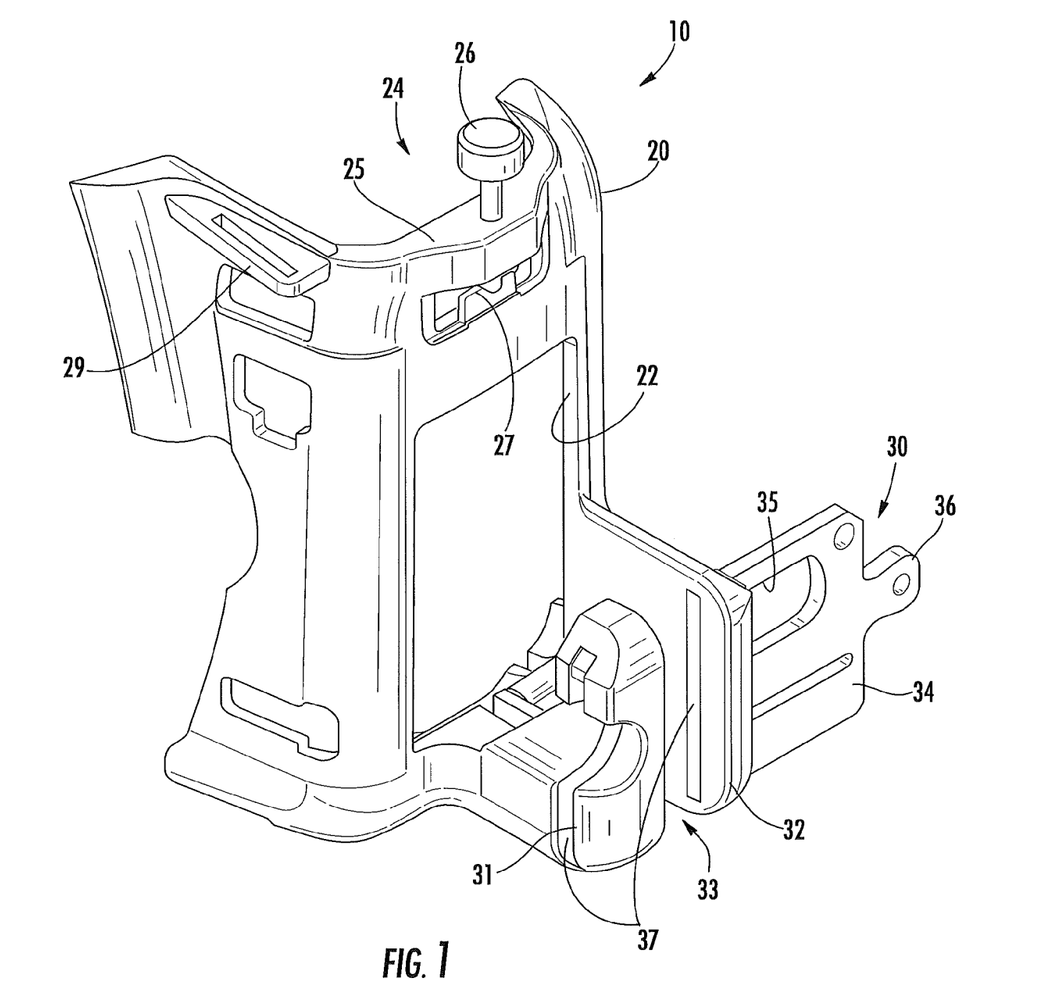
FIG. 1 is a top, front perspective view of an exemplary cable port protection apparatus, according to some embodiments of the present invention.
Figure 2:
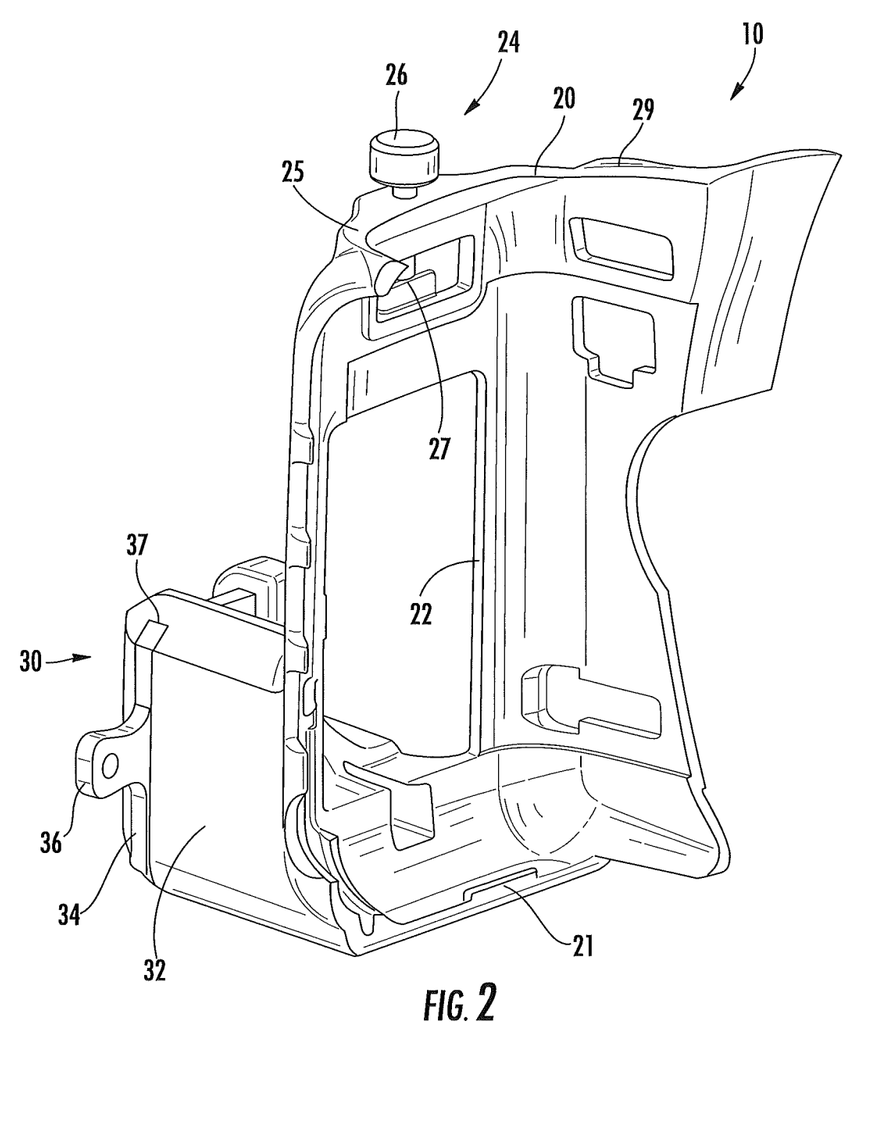
FIG. 2 is top, rear perspective view of the cable port protection apparatus of FIG. 1.
Figure 3:
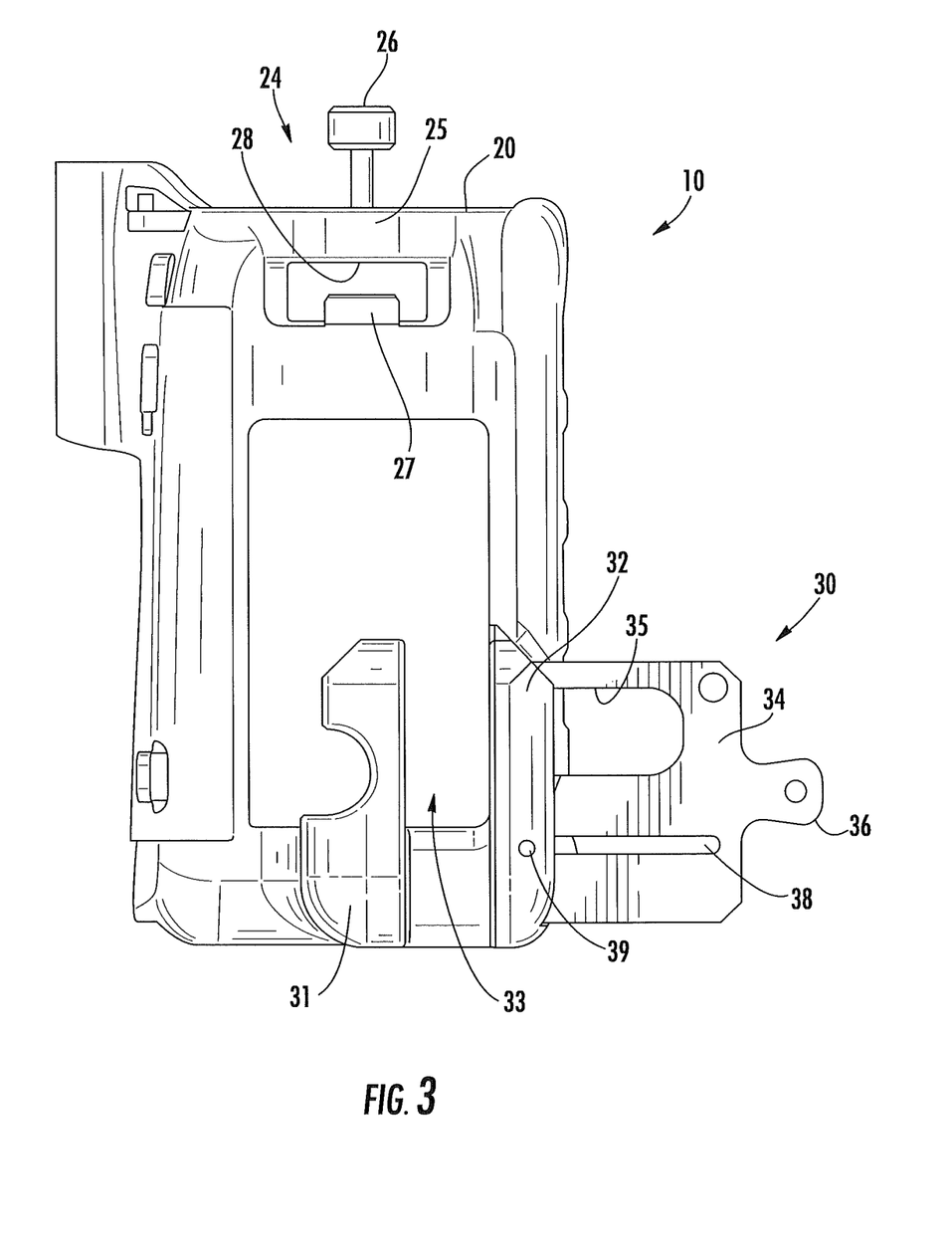
FIG. 3 is a front elevation view of the cable port protection apparatus of FIG. 1 with the gate of the cable retention mechanism in an open position.
Figure 4:
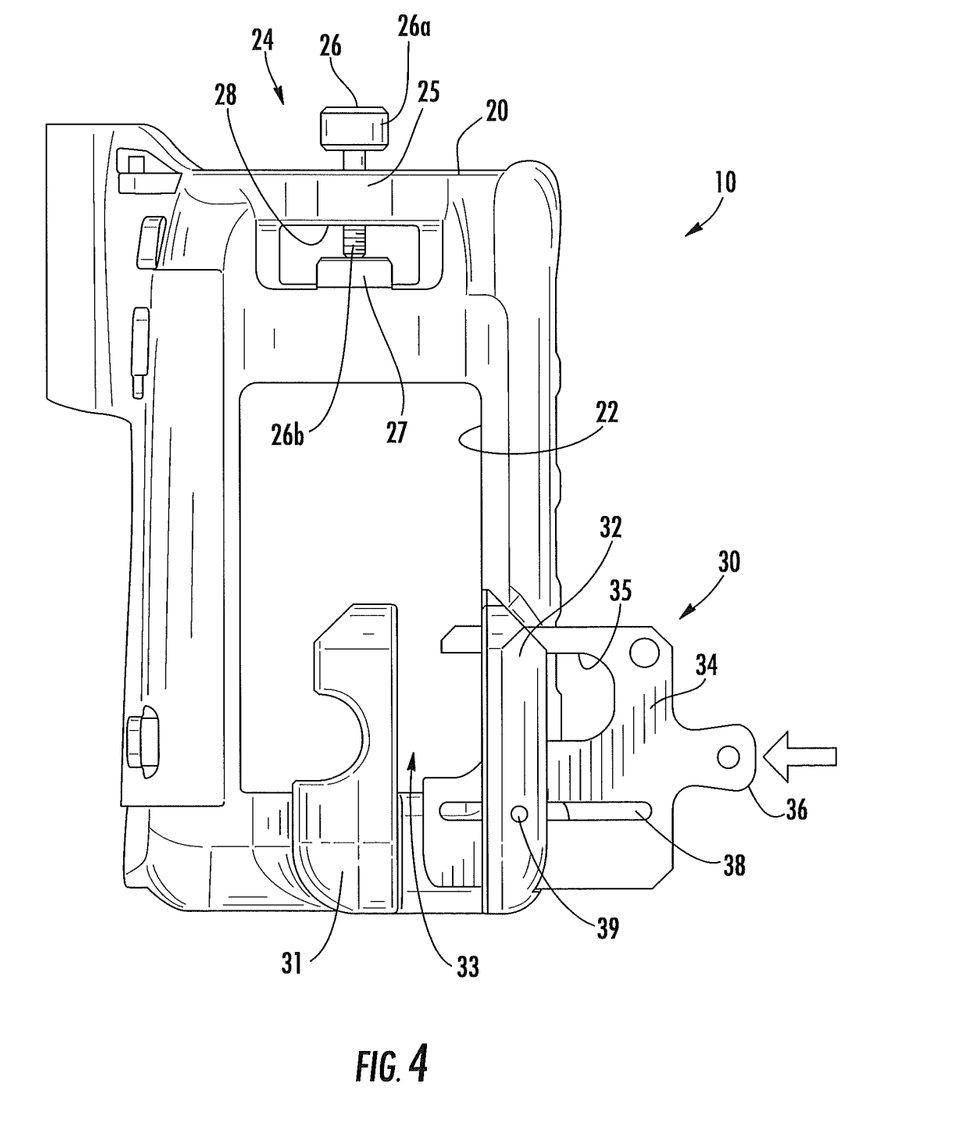
FIG. 4 is a front elevation view of the cable port protection apparatus of FIG. 1 with the gate of the cable retention mechanism in a partially open position.
Figure 5:
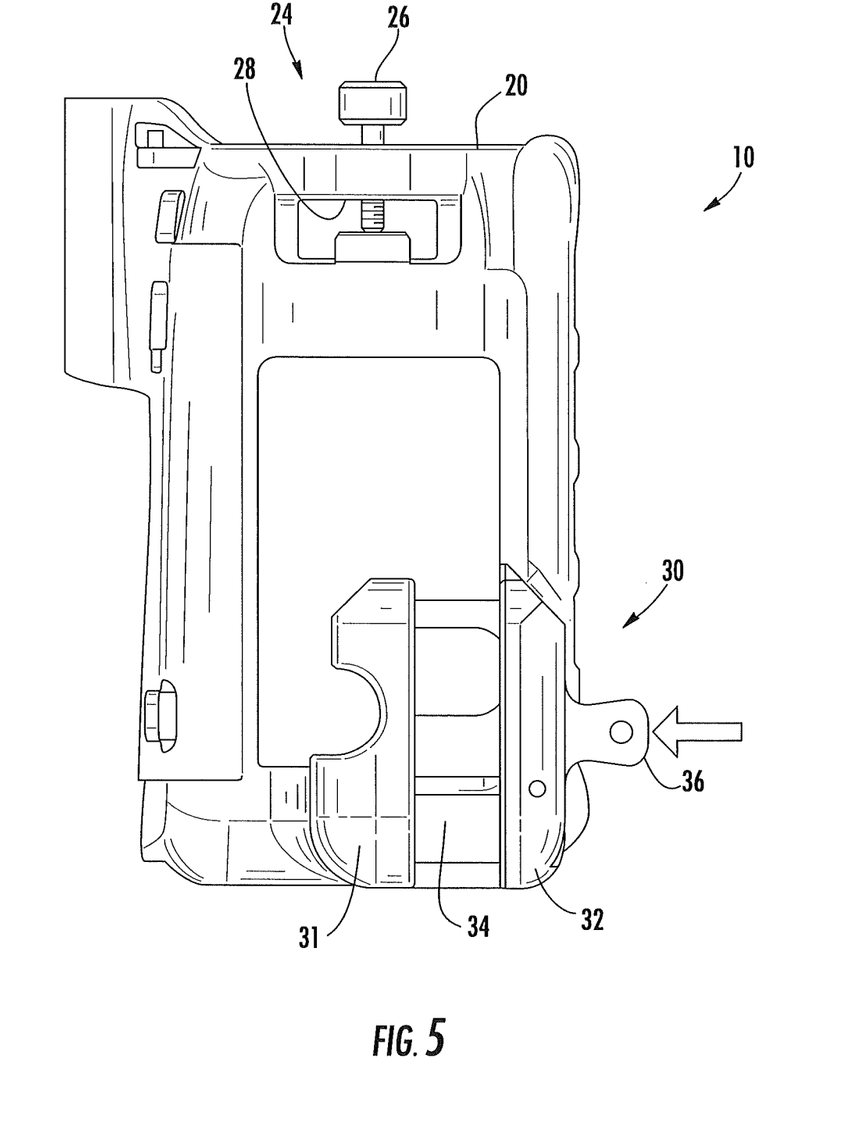
FIG. 5 is a front elevation view of the cable port protection apparatus of FIG. 1 with the gate of the cable retention mechanism in a closed position.
Figure 6:
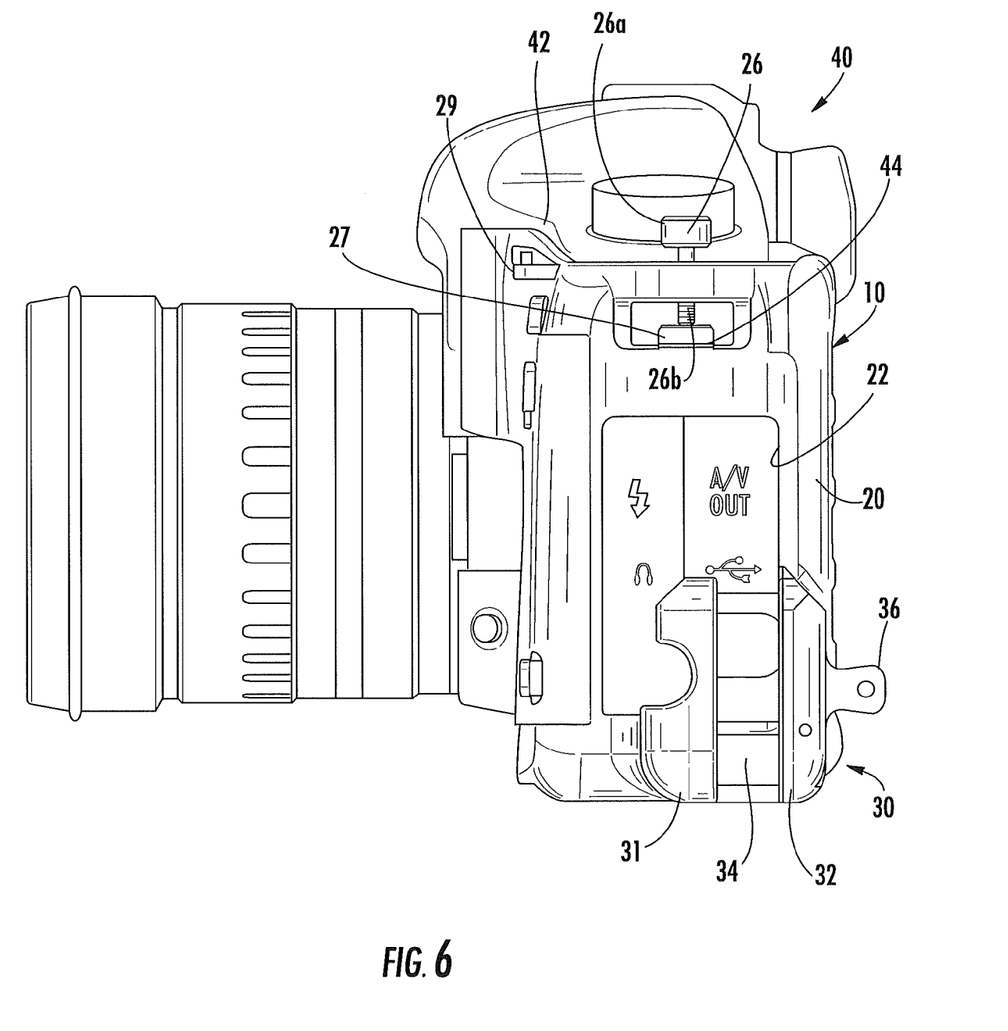
FIG. 6 is a side view of a camera with the cable port protection apparatus of FIG. 1 secured to a portion of the housing of the camera, according to some embodiments of the present invention.
Figure 7:
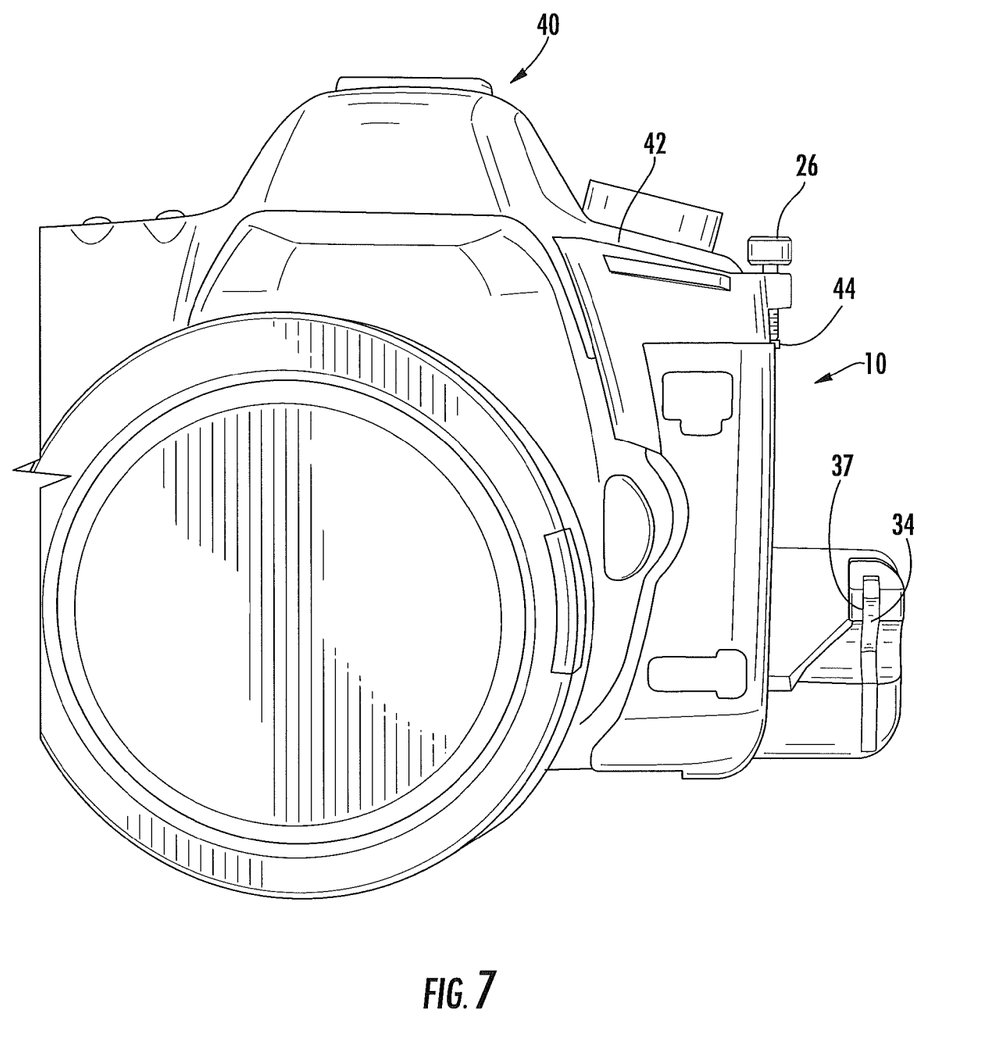
FIG. 7 is a front view of the camera of FIG. 6 with the cable port protection apparatus attached thereto.
Figure 8:
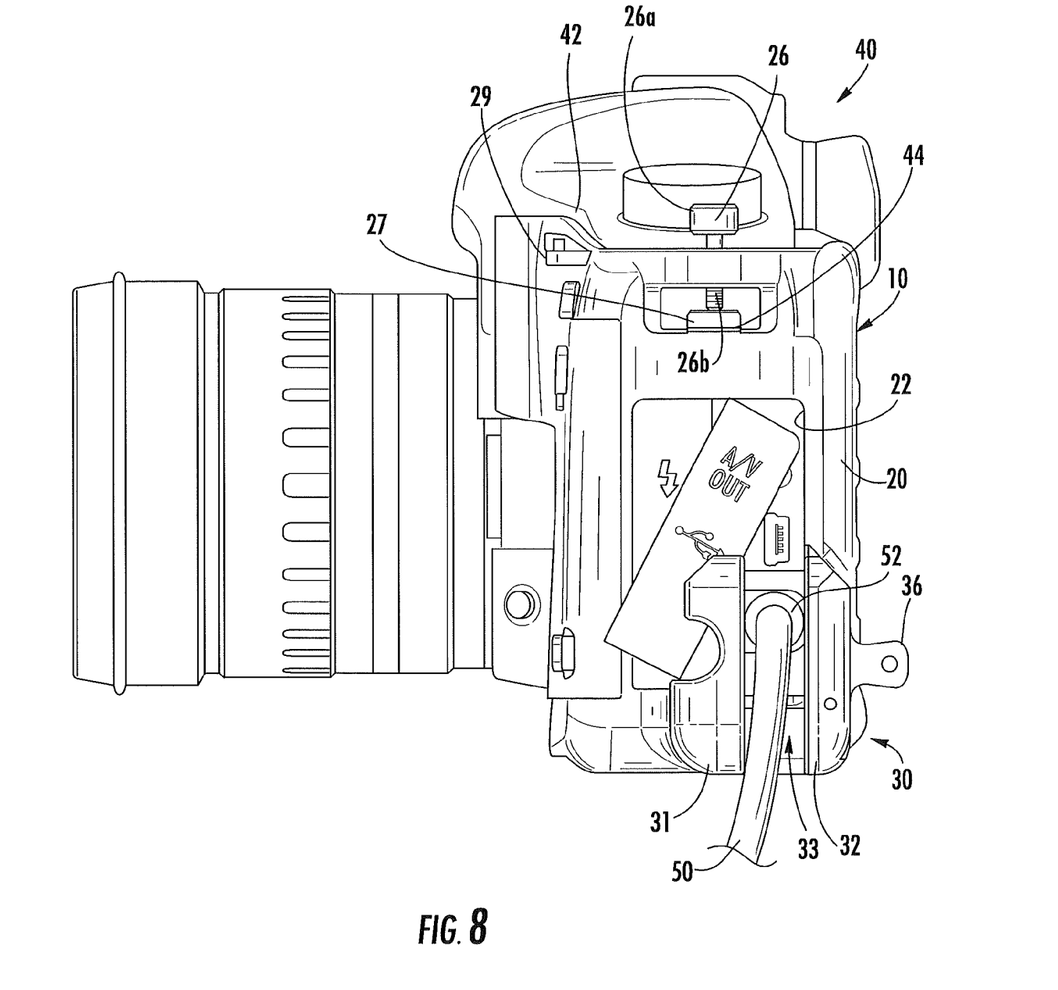
FIG. 8 illustrates a cable connected to a port of the camera of FIG. 6 wherein the cable connector is restrained from removal or other movement by the gate of the cable retention mechanism of FIG. 1.

Referring now to FIGS. 1-8, a cable port protection apparatus 10 for an electronic device, according to some embodiments of the present invention, is illustrated. The illustrated apparatus 10 includes a frame 20 and a cable retention mechanism 30 attached to the frame 20. The frame 20 is configured to be secured to a housing of an electronic device, such as a camera, and includes an opening 22 that provides cable access to at least one cable port in an electronic device housing. In some embodiments of the present invention, the frame 20 is configured to be secured to a portion of a housing of an electronic device. For example, the frame 20 is configured to be secured to a side portion of a camera housing as illustrated in FIGS. 6-8.

Although illustrated as being attached to a camera in the figures, a cable port protection apparatus, according to embodiments of the present invention, can be utilized with any type of electronic device having a cable port to which a cable is connected. Embodiments of the present invention are not limited to being attached to cameras or to a particular type of camera. As such, the shape of a cable port protection apparatus according to embodiments of the present invention may differ from that illustrated in FIGS. 1-8 depending on the device to which the cable port protection apparatus is attached.

The illustrated frame 20 has a contour that substantially conforms to a contour of a side portion of the camera housing (42, FIGS. 6-8). The cable retention mechanism 30 extends outwardly from the frame 20 adjacent the opening 22 in an unobtrusive manner, as illustrated. The frame 20 and the first and second spaced apart arms 31, 32 of the cable retention mechanism can be a single unitary and/or monolithic body of polymeric material, aluminum and/or other relatively light but structurally strong material. Embodiments of the present invention are not limited to any particular type of material. The cable port protection apparatus 10 can be manufactured by injection molding. Of course, machining, forging, casting or other material forming processes with sufficient precision may also be used, without limitation.

As illustrated in FIG. 6, the frame opening 22 provides access to various ports located in the side of the camera housing 42. The frame 20 is removably secured to the housing 42 of the camera 40 via a locking device 24 that is configured to engage a carrying strap eyelet 44 on the camera housing 42. The illustrated locking device 24 includes a cross member 25 having a threaded passageway 28 formed therethrough. A threaded locking member 26 is threadingly engaged with the threaded passageway 28 in the cross member 25 and has a proximal end 26a and an opposite distal end 26b. The proximal end 26a is configured (for example, has an enlarged, knurled configuration) to be gripped by a user and to facilitate rotation of the locking member 26 to secure the frame 20 to the camera housing 42.

The locking member 26 is configured to contact the top surface of the eyelet 44, creating upward pressure on the frame so that a tab 21 (FIG. 2) at the bottom of the frame 20 interlocks with the base of the camera 40 and is further engaged therewith. In addition, the frame 20 includes a tab 27 directly below the locking member 26 that extends upwardly through the eyelet 44. Tab 27 is configured to keep the frame 20 from falling off the camera body horizontally. The locking member 26, when engaged with the top surface of the eyelet 44 serves to keep tab 27 engaged with the eyelet. Other ways may be utilized to secure the frame 20 to the camera housing 42. Embodiments of the present invention are not limited to the illustrated locking device 24 or to the illustrated way of attaching the frame 20 to the camera housing 42.

In the illustrated embodiment, the frame 20 includes a carrying strap eyelet 29 that may be utilized to secure a carrying strap to the camera 40. The carrying strap eyelet 29 is a replacement eyelet for the eyelet 44 of the camera housing that is used to secure the frame 20 to the camera housing 42.

The illustrated cable retention mechanism 30 is located at a lower portion of the frame adjacent the opening 22 and includes first and second adjacent, spaced-apart arms 31, 32 extending outwardly from the frame 20 and that define a cable receiving space 33 therebetween. The cable receiving space 33 is in communication with the frame opening 22 such that a cable (50, FIG. 8) can be inserted through the cable receiving space 33, through the frame opening 22, and inserted within a cable port (e.g., an HDMI port) on the camera housing 42.

A gate 34 is operably associated with the spaced-apart arms 31, 32 and is movable between an open position (e.g., FIGS. 1, 3) and a closed position (FIGS. 2, 5, 6, 8). When the gate 34 is in an open position, a cable 50 (FIG. 8) can be inserted through the cable receiving space 33 between the two arms 31, 32 and can be connected to a cable port of the camera 40 through the frame opening 22. When the gate 34 is in a closed position, the cable connector 52 is engaged by the gate 34 and the cable 50 is prevented from becoming disconnected from the cable port and is also restrained from applying bending and/or axial forces on the cable port.

The illustrated gate 34 includes an open-ended slot 35 that is sized to engage a cable connector 52 when the gate 34 is moved to the closed position. By engaging the cable connector 52, the gate 34 restrains the cable 50 from deflecting at the cable port, thereby preventing damage to the cable port. The illustrated gate 34 is releasably retained in the closed position by at least one of the spaced-apart arms 31, 32. For example, in some embodiments of the present invention, the gate 34 includes a recessed portion or dimple that is configured to releasably engage a detent within one of the arms 31, 32. Alternatively, one of the arms 31, 32 includes a recessed portion or dimple that is configured to releasably engage a detent within the gate. However, various other ways of releasably maintaining the gate 34 in the closed position may be utilized.

The illustrated gate 34 also includes a handle 36 that is configured to be gripped by a user and that facilitates movement of the gate 34 by a user between the open and closed positions.

In the illustrated embodiment, the gate 34 cooperates with and is slidably engaged within respective slots 37 formed in the first and second arms 31, 32. The gate 34 includes a closed end slot 38 and is engaged with a pin 38 that extends across a slot 37 in the second arm 32. The engagement of the pin 38 and closed end slot 38 in the gate 34 prevents the gate 34 from being completely removed from the second arm 32, thereby preventing the gate 34 from being accidently lost.

Embodiments of the present invention are particularly suitable for restraining HDMI cables connected to HDMI ports on cameras and other electronic devices. However, embodiments of the present invention are not restricted to use with HDMI cables and ports and may be utilized with any type of digital, analog, data and/or power cable and/or port (e.g., USB, FireWire, audio, charging, etc.).

In other embodiments of the present invention, a cable port protection apparatus may include a universal frame 20 that is provided with inserts and/or adapters that allow the frame 20 to be used in conjunction with multiple different types/models and/or brands of electronic devices. For example, a frame 20 may include adapters and/or inserts that allow the frame 20 to be attached to all models of Canon® DSLR cameras; another frame 20 may include adapters and/or inserts that allow the frame 20 to be attached to all models of Nikon® DSLR cameras, etc.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A cable port protection apparatus, comprising:
   a frame configured to be secured to a housing of an electronic device, wherein the frame comprises an opening that provides cable access to a cable port in the housing; and
   a cable retention mechanism attached to the frame and configured to prevent unintentional removal of a cable from the cable port.

2. The apparatus of claim 1, wherein the frame is configured to be secured to a portion of the housing of the electronic device.

3. The apparatus of claim 2, wherein the frame has a contour that substantially conforms to a contour of the housing portion.

4. The apparatus of claim 1, wherein the frame includes a locking device that removably secures the frame to the housing.

5. The apparatus of claim 1, wherein the electronic device is a camera.

6. The apparatus of claim 5, wherein the camera housing includes a carrying strap eyelet, and wherein the frame includes a locking device that is configured to engage the eyelet and removably secure the frame to the camera housing.

7. The apparatus of claim 6, wherein the locking device comprises a threaded member that contacts a top surface of the eyelet, and wherein the frame comprises a tab that extends upwardly through the eyelet.

8. The apparatus of claim 1, wherein the cable retention mechanism comprises:
   a pair of spaced-apart arms extending outwardly from the frame to define a cable receiving space; and
   a gate operably associated with the spaced-apart arms and that is movable between open and closed positions, wherein when in an open position, a cable can be inserted through the cable receiving space and be connected to the cable port, and when in a closed position, the cable is prevented by the gate from becoming disconnected from the cable port.

9. The apparatus of claim 8, wherein the gate is configured to engage a cable connector inserted within the cable port when the gate is moved to the closed position and to prevent the cable connector from disengaging from the cable port.

10. The apparatus of claim 9, wherein the gate comprises an open-ended slot that engages the cable connector when the gate is moved to the closed position.

11. The apparatus of claim 8, wherein the gate is releasably retained in the closed position by at least one of the spaced-apart arms.

12. The apparatus of claim 8, wherein the gate comprises a handle configured to be gripped by a user and that facilitates movement of the gate between the open and closed positions.

13. The apparatus of claim 1, wherein the frame comprises a carrying strap eyelet.

14. A cable port protection apparatus, comprising:
   a frame configured to be secured to a housing of an electronic device, wherein the frame comprises an opening that provides cable access to a cable port in the housing, and a locking device that removably secures the frame to the housing; and
   a cable retention mechanism attached to the frame, the cable retention mechanism comprising:
   a pair of spaced-apart arms extending outwardly from the frame to define a cable receiving space; and
   a gate operably associated with the spaced-apart arms and that is movable between open and closed positions, wherein when in an open position, a cable can be inserted through the cable receiving space and be connected to the cable port, and when in a closed position, the cable is prevented by the gate from becoming disconnected from the cable port.

15. The apparatus of claim 14, wherein the frame is configured to be secured to a portion of the housing of the electronic device.

16. The apparatus of claim 15, wherein the frame has a contour that substantially conforms to a contour of the housing portion.

17. The apparatus of claim 14, wherein the electronic device is a camera.

18. The apparatus of claim 17, wherein the camera housing includes a carrying strap eyelet, and wherein the frame includes a locking device that is configured to engage the eyelet and removably secure the frame to the camera housing.

19. The apparatus of claim 14, wherein the gate is releasably retained in the closed position by at least one of the spaced-apart arms.

20. The apparatus of claim 14, wherein the frame comprises a carrying strap eyelet.

* * * * *